United States Patent
Blanco et al.

(10) Patent No.: US 8,634,798 B2
(45) Date of Patent: Jan. 21, 2014

(54) SUPPORT IN HSS FOR EMERGENCY TELECOMMUNICATION SERVICES

(75) Inventors: Germán Blanco, Paracuellos del Jarama (ES); Berta Isabel Escribano Bullon, Madrid (ES); Beatriz Maroto Gil, Majadahonda Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 34 days.

(21) Appl. No.: 13/383,746

(22) PCT Filed: Oct. 9, 2009

(86) PCT No.: PCT/IB2009/007087
§ 371 (c)(1),
(2), (4) Date: Jan. 12, 2012

(87) PCT Pub. No.: WO2011/007195
PCT Pub. Date: Jan. 20, 2011

(65) Prior Publication Data
US 2012/0115432 A1    May 10, 2012

Related U.S. Application Data

(60) Provisional application No. 61/225,759, filed on Jul. 15, 2009.

(51) Int. Cl.
*H04M 11/00* (2006.01)

(52) U.S. Cl.
USPC .............. 455/404.1; 455/414.1; 455/422.1; 455/423; 455/432.3

(58) Field of Classification Search
USPC .............. 455/404.1, 414.1, 422.1, 432.3, 423
See application file for complete search history.

(56) References Cited

U.S. PATENT DOCUMENTS

| | | |
|---|---|---|
| 2006/0072522 A1 | 4/2006 | Chandra et al. |
| 2006/0141995 A1 | 6/2006 | Purnadi et al. |
| 2008/0101224 A1 | 5/2008 | Khasnabish |
| 2008/0226049 A1 | 9/2008 | Kumar et al. |
| 2009/0132163 A1* | 5/2009 | Ashley et al. ................ 701/206 |

OTHER PUBLICATIONS

International Search Report for PCT/IB2009/007087, mailed Jun. 15, 2010.
El Barachi et al., "Enhancing the Qos and Resource Management Aspects of the 3GPP IMS Emergency Service Architecture", Consumer Communications and Networking Conference 2008, (Jan. 1, 2008), pp. 112-116.

* cited by examiner

*Primary Examiner* — Nghi H Ly
(74) *Attorney, Agent, or Firm* — Nixon & Vanderhye P.C.

(57) ABSTRACT

A home subscriber server (HSS) and method are described herein for supporting an emergency telecommunication service (e.g., Government Emergency Telecommunications Service (GETS)). In one embodiment, the HSS and the method are adapted to selectively provide telecommunication access to subscribers of an IP Multimedia Subsystem (IMS) by associating different user priority values with different network condition statuses, where a network condition status may be a congestion level or a disaster relief emergency status.

16 Claims, 4 Drawing Sheets

SUPPORT IN HSS FOR EMERGENCY TELECOMMUNICATION SERVICES

This application is the U.S. national phase of International Application No. PCT/IB2009/007087, filed 9 Oct. 2009, which designated the U.S. and claims the benefit of U.S. Provisional Application No. 61/225,759, filed 15 Jul. 2009, the entire contents of each of which are hereby incorporated by reference.

TECHNICAL FIELD

The present invention relates in general to an IP Multimedia Subsystem (IMS) and, in particular, to a home subscriber server (HSS) and method for supporting a Government Emergency Telecommunications Service (GETS). An example of GETS is the US Emergency Telecommunications Service (ETS) which provides priority telecommunication service to authorized users during a disaster or some other type of emergency.

BACKGROUND

The following terms and abbreviations are herewith defined, at least some of which are referred to within the following description of the prior art and the present invention.
  3GPP 3rd Generation Partnership Project
  AS Application Server
  AVP Attribute Value Pair
  DSAI Dynamic Service Activation Info
  GETS Government Emergency Telecommunications Service
  GPRS General Packet Radio Service
  GRUU Globally Routable UA (User Agent) URI (Uniform Resource Identifier)
  HSS Home Subscriber Server
  I-CSCF Interrogating Call Server Control Function
  IMPI IP Multimedia Private Identity
  IMPU IP Multimedia Public Identity
  IMS IP Multimedia Subsystem
  IP Internet Protocol
  MSISDN Mobile Subscriber ISDN Number
  PCRF Policy and Charging Rules Function
  P-CSCF Proxy Call Server Control Function
  S-CSCF Serving Call Server Control Function
  UE User Equipment The current telecommunication networks all employ some sort of mechanism that is used for handling congestion control and node availability. In this respect, the current telecommunication networks all have some sort of mechanism for rejecting new traffic whenever the network has reached a significant congestion level. However, the current telecommunication networks treat all of the users in the same manner which makes it impossible to distinguish the different users when there is network congestion (at network or node level). As a result, when the current telecommunication networks detect network congestion the new users and their calls (messages) are rejected as they are received regardless of the user's identity or any other user indication. This situation is problematic especially when some sort of disaster has occurred, which can causes network congestion and make it difficult for emergency service personnel to obtain telecommunication service so they can perform national or local security activities. For example, fire department personnel or any comparable emergency service personnel should not be prevented from accessing a telecommunication service, irrespective of the network congestion level, while non-essential users are still permitted access to the telecommunication service. Accordingly, there has been a need to address the current telecommunication networks shortcoming associated with not being able to distinguish users when providing access to telecommunication services especially during times when there is significant network congestion such as during some type of disaster or emergency. This need and other needs are addressed by the present invention.

SUMMARY

In one aspect, the present invention provides a method for selectively providing service access to subscribers of an IP Multimedia Subsystem (IMS) by associating different user priorities with different network statuses. In one embodiment, the method includes the steps of: (a) provisioning a user table to store a user profile for a subscriber, where the user profile includes multiple network condition statuses, where a user priority value is associated with each network condition status, and where the one or more user priority values are associated with an emergency telecommunications service; (b) provisioning an emergency policy table to store a policy profile applicable for all subscribers, where the policy profile includes the multiple network condition statuses, and where a minimum priority value is associated with each network condition status; (c) determining a current network condition; (d) fetching from the emergency policy table the minimum priority value associated with the network condition status that corresponds with the current network condition; (e) receiving a registration request for the subscriber and then fetching from the user table the user priority value associated with the network condition status that corresponds with the current network condition; and (f) comparing the fetched minimum priority value to the fetched user priority value and if the fetched user priority value corresponds to a same or higher user priority than the fetched minimum priority value then allow the registration request for the subscriber otherwise reject the registration request for the subscriber. The method ensures that telecommunication services are provided for users with certain privileges (user priority values) during a disaster or emergency situation.

In yet another aspect, the present invention provides a HSS for selectively providing service access to subscribers of an IP Multimedia Subsystem (IMS) by associating different user priorities with different network statuses. In one embodiment, the HSS includes (a) a processor; and (b) a memory that stores processor-executable instructions where the processor interfaces with the memory and executes the processor-executable instructions to: (1) provision a user table to store a user profile for a subscriber, where the user profile includes multiple network condition statuses, where a user priority value is associated with each network condition status, and where the one or more user priority values are associated with an emergency telecommunications service; (2) provision an emergency policy table to store a policy profile for all subscribers, where the policy profile includes the multiple network condition statuses, and where a minimum priority value is associated with each network condition status; (3) determine a current network condition; (4) fetch from the emergency policy table the minimum priority value associated with the network condition status that corresponds with the current network condition; (5) receive a registration request for the subscriber and then fetching from the user table the user priority value associated with the network condition status that corresponds with the current network condition; and (6) compare the fetched minimum priority value to the fetched user priority value and if the fetched user priority value corresponds to a same or higher user priority than the fetched minimum priority value then allow the registration request for the subscriber otherwise reject the registration request for the subscriber. The HSS effectively ensures that telecommunication services are provided for users with certain privileges (user priority values) during a disaster or emergency situation.

In still yet another aspect, the present invention provides a method implemented by a serving call session control function (hereinafter S-CSCF) for supporting an emergency telecommunications service. The method including the steps of: (a) receiving a user profile for a subscriber, where the user profile includes multiple network condition statuses, where a user priority value is associated with each network condition status, and where the one or more user priority values are associated with the emergency telecommunications service; (b) determining a current network condition; and (c) deregistering a registered subscriber as a result of using the user profile to determine that the registered subscriber has an insufficient user priority value based on the current network condition. The method ensures that a registered subscriber looses their telecommunication service if the current network condition changes in a manner where the registered subscriber no longer has a sufficient user priority value based on the current network condition.

In accordance with a still further aspect, the present invention provides for a serving call session control function (hereinafter S-CSCF) for supporting an emergency telecommunications service, In one embodiment, the S-CSCF includes (a) a processor; and (b) a memory that stores processor-executable instructions where the processor interfaces with the memory and executes the processor-executable instructions to: (1) receive a user profile for a registered subscriber, where the user profile includes a plurality of network condition statuses, where a user priority value is associated with each network condition status, and where the one or more user priority values are associated with the emergency telecommunications service; (2) receive an emergency policy profile, where the emergency policy profile includes the plurality of network condition statuses, and where a minimum priority value is associated with each network condition status; (3) determine a current network condition; (4) fetch from the emergency policy profile the minimum priority value associated with the network condition status that corresponds with the current network condition; (5) fetch from the user profile the user priority value associated with the network condition status that corresponds with the current network condition; (6) compare the fetched minimum priority to the fetched user priority value and if the fetched user priority value corresponds to a lower user priority than the fetched minimum priority value, then determining there is an insufficient user priority value based on the current network condition, otherwise determining there is a sufficient user priority; and (7) deregister the registered subscriber when the registered subscriber has the insufficient user priority value based on the current network condition. The S-CSCF ensures that a registered subscriber looses their telecommunication service if the current network condition changes in a manner where the registered subscriber no longer has a sufficient user priority value based on the current network condition.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
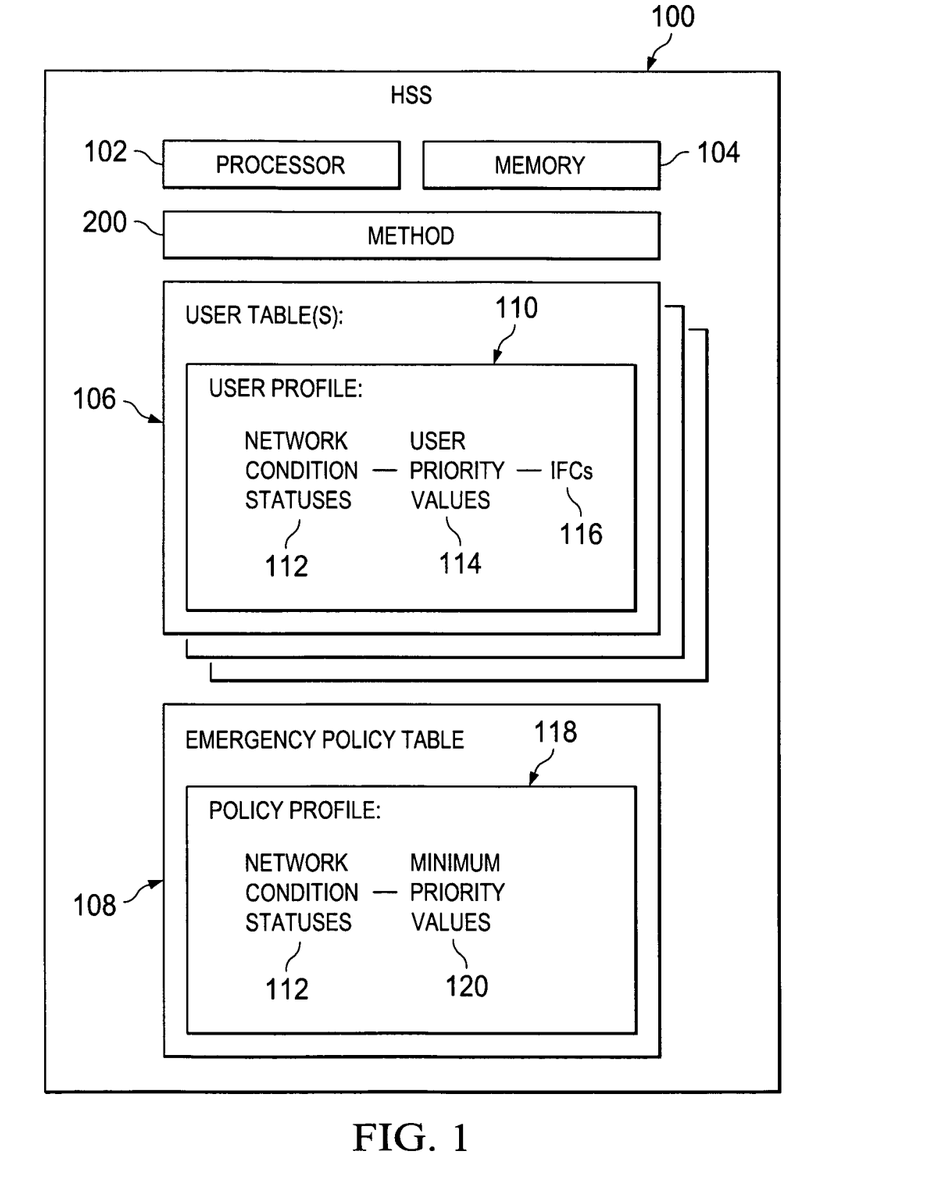
FIG. 1 is a diagram of an exemplary home subscriber server configured to support an emergency telecommunication service in accordance with an embodiment of the present invention.

Referring to FIG. 1, there is a block diagram illustrating an exemplary home subscriber server 100 (HSS 100) which implements a method 200 to support an emergency telecommunications service (e.g., GETS, ETS) in accordance with an embodiment of the present invention. The HSS 100 includes a processor 102 and a memory 104 that stores processor-executable instructions where the processor 102 interfaces with the memory 104 and executes the processor-executable instructions to implement method 200 to support an emergency telecommunications service. In addition, the HSS 100 includes one or more user tables 106 (only one shown for one subscriber) and an emergency policy table 108. The HSS 100 also includes many other components which are well known to those skilled in the art but for clarity purposes have not been discussed in this document. A detailed discussion is provided next about how the HSS 100 can implement method 200 to support an emergency telecommunications service (e.g., GETS, ETS).

Figure 2:
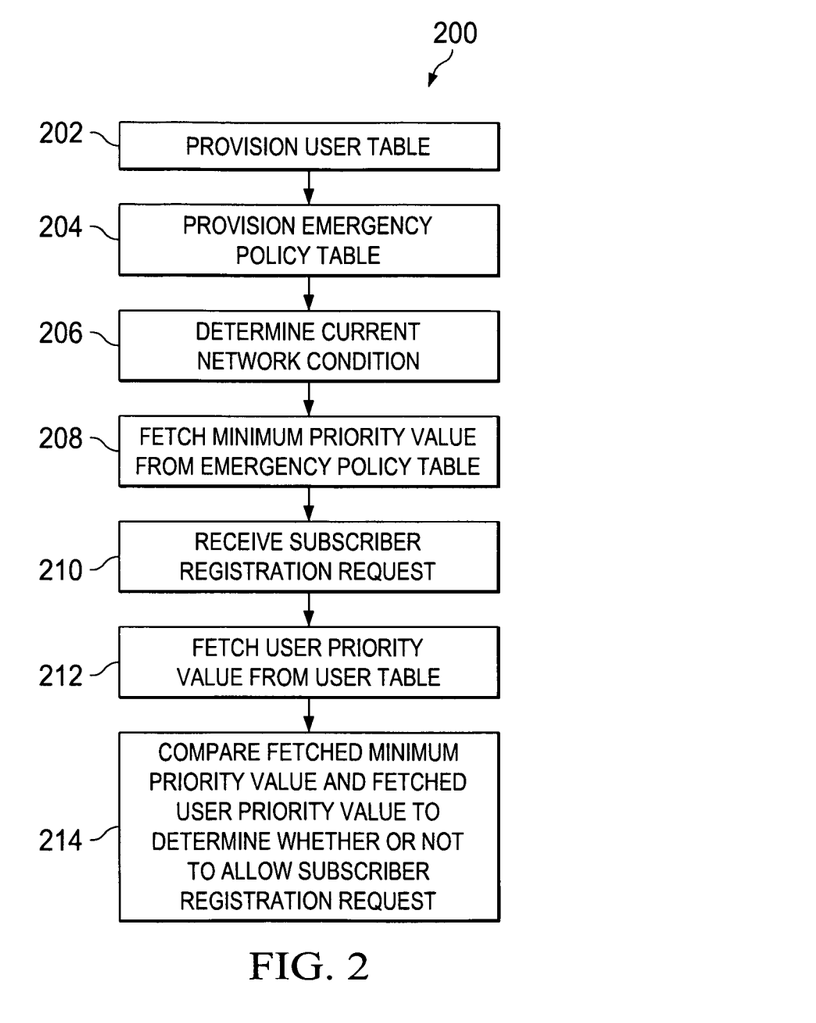
FIG. 2 is a flowchart illustrating the steps of a method for supporting an emergency telecommunication service in accordance with an embodiment of the present invention.

Referring to FIG. 2, there is a flowchart illustrating the steps of the method 200 for supporting an emergency telecommunication service in accordance with an embodiment of the present invention. At step 202, the HSS 100 provisions the user table 106 to store a user profile 110 for a particular subscriber, where the user profile 110 includes multiple network condition statuses 112, where a user priority value 114 is associated with each network condition status 112, and where the one or more user priority values 114 are associated with the emergency telecommunications service. For instance, the HSS 100 may support a particular subscriber which has the following exemplary user profile 110:

TABLE #1

Exemplary User Profile 110
network condition status=0; user priority value=1
network condition status =1; user priority value=1
network condition status =2; user priority value=2
network condition status =3; user priority value=2
network condition status =4; user priority value=5

In this embodiment, each user profile 110 has all of the possible network conditions indicators 112 (e.g., network condition values 0-4) and every network condition status 112 has a user priority value 114 (e.g., user priority values 1-5). However, the number of user priority values 114 used may be less than the total amount of possible user priority values 114 (i.e. there may be repetitions). Of course, other subscribers would have their own user profiles 110 each of which would have different user priority values 114 for the complete series of network condition statuses 112. Exemplary network condition statuses 112 are as follows:

TABLE #2

Exemplary Network Condition Statuses 112
network condition status =0 (indicates normal conditions)
network condition status =1 (indicates slight congestion level)
network condition status =2 (indicates medium congestion level (rush hour)).
network condition status =3 (indicates high congestion level (mother's day)).
network condition status =4 (indicates emergency congestion level (natural disaster, terrorist attack...)

Exemplary user priority levels 114 are as follows:

TABLE #3

| | User Priority Levels 114 |
|---|---|
| 1 | highest priority (policy makers and executive leaderships) |
| 2 | top priority (military command) |
| 3 | medium priority (public health and law enforcement) |
| 4 | low priority 1 (public services) |
| 5 | low priority 2 (disaster recovery) |
| 6 | lowest priority (normal user) |

Note:
The user priority levels 1-5 are the same as the ones defined in GETS and if desired a user priority level 6 can be added to the existing GETS classification to indicate a normal user's priority (lowest one).

Thus, the HSS 100 is provisioned to add a new attribute at a subscriber's service profile level where the subscriber's user profile 110 now includes a specific user priority value 114 for each of the network condition statuses 112. As an option, if the HSS 110 is not provisioned to add the new attributes (network condition statuses 112 and user priority values 114) to the subscriber's user profile 110 then it could by default add these new attributes to the subscriber's user profile 110. If desired, the subscriber's user profile 110 can be configured to include different initial filter criteria (hereinafter IFC) 116, which are to be applied for that particular subscriber depending on the particular network condition status 112. For example, the HSS 100 may support a subscriber which has the following exemplary user profile 110:

TABLE #4

Exemplary User Profile 110
network condition status =0; user priority value=1; IFC 1
network condition status =1; user priority value=1; IFC 1
network condition status =2; user priority value=2; IFC 2
network condition status =3; user priority value=2; IFC 2
network condition status =4; user priority value=5; IFC 3

The IFCs 116 are similar to the filter criteria that are currently used in the 3GPP IMS standard, but have been configured to be used for emergency telecommunication services (e.g., GETS, ETS). For instance, the exemplary IFC 1, IFC 2 and IFC 3 shown in TABLE #4 could be as follows:
 IFC 1 could be a configuration to allocate maximum communication capabilities for this user.
 IFC 2 could be a configuration that allows only voice calls and short messages.
 IFC 3 could be a configuration so that the user is not allowed to make any calls.

At step 204, the HSS 100 provisions the emergency policy table 108 to store a policy profile 118 applicable for all of the subscribers, where the policy profile 118 includes the multiple network condition statuses 112, and where a minimum priority value 120 is associated with each network condition status 112. For instance, the HSS 100 may provision the following exemplary policy profile 118:

TABLE #5

Exemplary Policy Profile 118
network condition status =0; minimum priority value=5
network condition status =1; minimum priority value=3
network condition status =2; minimum priority value=2
network condition status =3; minimum priority value=2
network condition status =4; minimum priority value=1

In this embodiment, the policy profile 118 has all of the possible network condition statuses 112 (e.g., network condition values 0-4) and every network condition status 112 has a minimum priority value 120 (e.g., minimum priority values 1-5). However, the number of minimum priority values 120 used may be less than the total amount of possible minimum priority values 120 (i.e. there may be repetitions). The purpose of the policy profile 118 and the minimum priority values 120 will become apparent during the discussion of steps 206-214.

At step 206, the HSS 100 determines a current network condition. For instance, the HSS 100 can determine the current network condition by calculating it itself or by receiving information about the current network status from anyone of the nodes (e.g., S-CSCF 310) located in the IP Multimedia Subsystem (IMS). Alternatively, the network operator may use some input command to send the current network condition to the HSS 100. In either case, the HSS 100 provisions the received current network condition by overwriting the previous current network condition. As an example, the current network condition can be "2".

At step 208, the HSS 100 fetches from the emergency policy table 108 the minimum priority value 120 associated with a particular network condition status 112 that corresponds with the current network condition. As an example, the fetched minimum priority value 120 can be "2" (see TABLE #5).

Figure 3:
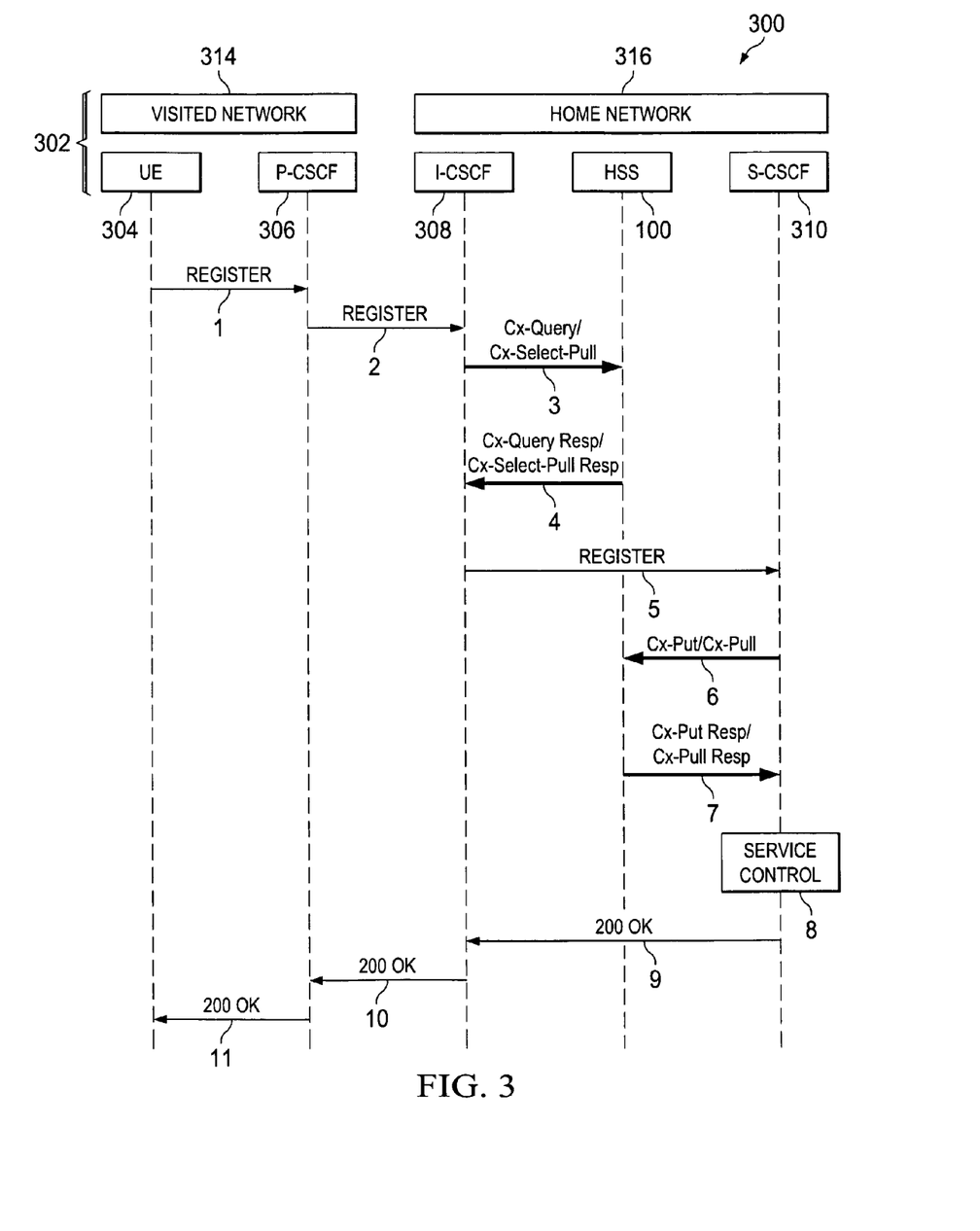
FIG. 3 is a signal flow diagram illustrating a 3GPP IMS registration process which is used to help explain how the HSS can respond to a subscriber's registration query in accordance with an embodiment of the present invention.

At steps 210 and 212, the HSS 100 receives a registration request for a particular subscriber from an I-CSCF (for example) (see FIG. 3). Thereafter, the HSS 100 fetches from the particular subscriber's user table 106 the user priority value 114 associated with a particular network condition status 112 that corresponds with the current network condition. As an example, the fetched user priority value 114 can be "2" (see TABLE #4).

At step 214, the HSS 100 compares the fetched minimum priority value 120 to the fetched user priority value 114 and if the fetched user priority value 114 corresponds to a same or higher user priority than the fetched minimum priority value 120 then the registration request is allowed for the particular subscriber otherwise the registration request is rejected for the particular subscriber. Following the same example, since the fetched user priority value 114 is "2" and the fetched minimum priority 120 is "2" then the registration request will be allowed for the subscriber.

Figure 4:
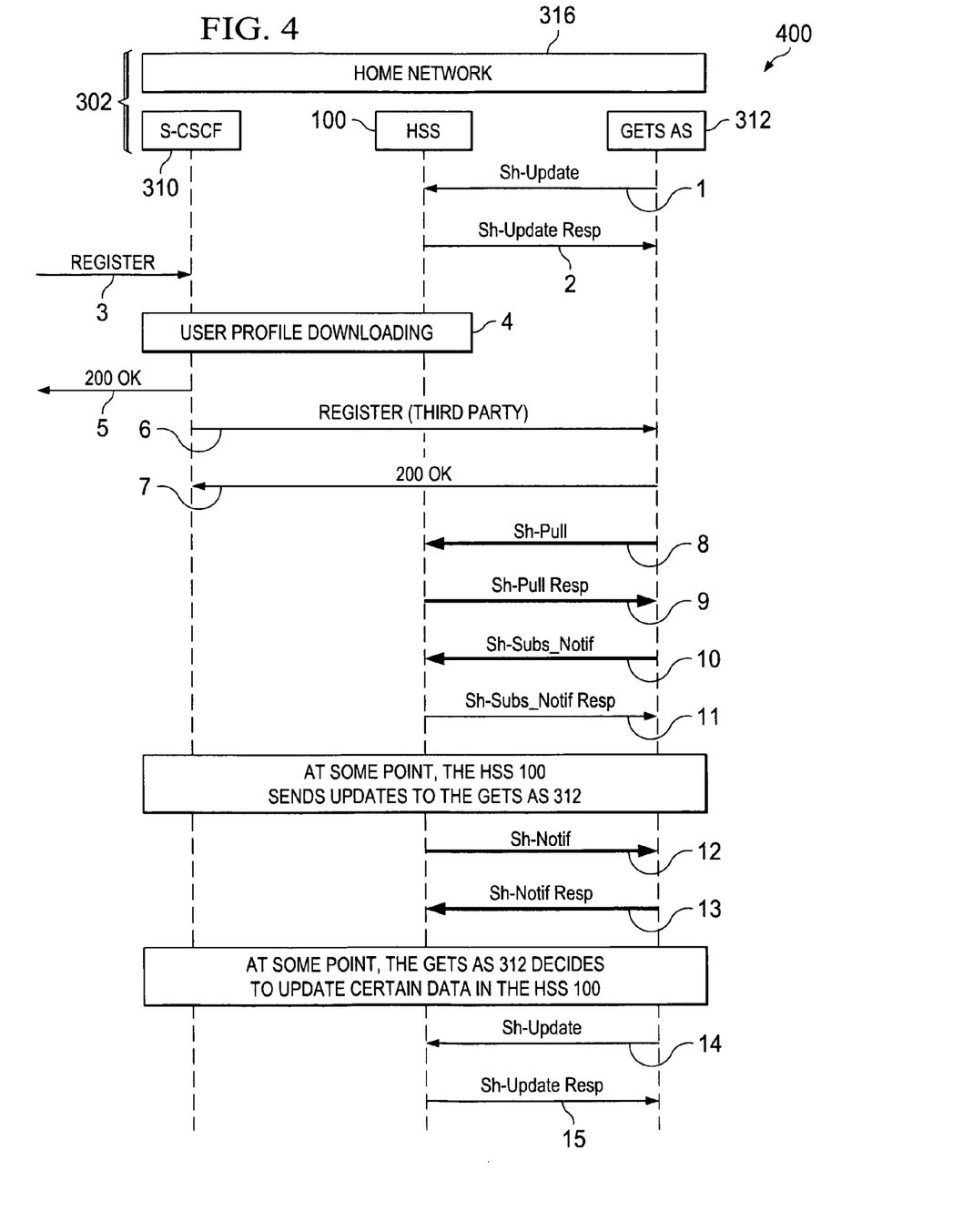
FIG. 4 is a signal flow diagram illustrating a third party registration which is used to explain how the HSS can download subscriber information to a GETS AS in accordance with an embodiment of the present invention.

Referring to FIGS. 3-4, there are two signal flow diagrams 300 and 400 which are used to help explain how an IP Multimedia Subsystem (IMS) 302 can utilize the HSS 100 to support an emergency telecommunications service in accordance with an embodiment of the present invention. As shown, the IP Multimedia Subsystem 302 includes components such as the subscriber's UE 304, P-CSCF 306, I-CSCF 308, S-CSCF 310 and the GETS AS 312 which are used to describe how the enhanced HSS 100 supports an emergency telecommunications service. In this example, the subscriber's UE 304 and the P-CSCF 306 are shown located in a visited network 314 while the I-CSCF 308, the S-CSCF 310, the GETS AS 312 and the enhanced HSS 100 are shown located in a home network 316. The IP Multimedia Subsystem 302 also includes many other components which are well known to those skilled in the art but for clarity purposes have not been discussed in this document.

In the signal flow diagram 300, an enhanced 3GPP IMS registration process is illustrated where the subscriber's UE 304 is located in a visited network 314 and attempts to register with the home network 316 in accordance with an embodiment of the present invention. The signal flow diagram 300 is also provided to help describe the impact that the enhanced HSS 100 has on the Cx protocol between the HSS 100 and both the I-CSCF 308 and the S-CSCF 310 when an unregistered subscriber's UE 304 attempts to register with the home network 316. The steps of an exemplary 3GPP IMS registration are as follows:

1. After the UE 304 has obtained IP connectivity, it can attempt to perform the IMS registration. To do so, the UE 304 sends a Register information flow (containing Public User Identity, Private User Identity, home network domain name, UE IP address, Instance Identifier, GRUU Support Indication) to the P-CSCF 306.

2. Upon receipt of the register information flow, the P-CSCF 306 examines the "home network domain name" to discover the entry point (i.e., the I-CSCF 308) to the home network 316. The P-CSCF 306 sends a Register information flow (containing P-CSCF address/name, Public User Identity, Private User Identity, P-CSCF network identifier, UE IP address) to the I-CSCF 308.

3. The I-CSCF 308 sends a Cx-Query/Cx-Select-Pull information flow (containing the Public User Identity, Private User Identity, P-CSCF network identifier) to the HSS 100. As discussed above, the HSS 100 is configured with a user profile 110 and other policies which are used to determine whether to accept or reject the subscriber's UE 304 registration attempt (see FIG. 2).

For example, HSS 100 can be configured with the following information:

IMPU1

At subscriber service profile level, it is stored that this subscriber (subscriber's UE 304) has:
  Priority: 1 for network condition status: 0; IFC: 1
  Priority: 1 for network condition status: 1; IFC: 1
  Priority: 2 for network condition status: 2; IFC: 2
  Priority: 2 for network condition status: 3; IFC: 2
  Priority: 5 for network condition status: 4; IFC: 3

IMPU2

At subscriber service profile level, it is stored that this subscriber (not shown) has:
  Priority: 5 for network condition status: 0; IFC: 1
  Priority: 5 for network condition status: 1; IFC: 1
  Priority: 5 for network condition status: 2; IFC: 1
  Priority: 5 for network condition status: 3; IFC: 2
  Priority: 5 for network condition status: 4; IFC: 2

Assume that for network status 0 (normal way of working, no congestion), all the registration attempts for all users with the different users priorities, are going to be accepted. But for network status 3, registrations are going to be accepted only for users with priority values 1 and 2 (minimum priority value 2). In the later case, the registration attempt (Cx query response message) is going to be accepted for IMPU1 and not IMPU2.

4. If a Cx-Query Resp/Cx-Select-Pull Response is sent from the HSS 100 to the I-CSCF 304 (e.g., in response to the allowed registration attempt for IMPU1). The Cx-Query Resp/Cx-Select-Pull Response would contain the name of the S-CSCF 310, if it is known by the HSS 100, or the S-CSCF 310 capabilities, if it is necessary to select a new S-CSCF 310. When capabilities are returned, the I-CSCF 304 performs a new S-CSCF selection function based on the capabilities returned. If the checking in the HSS 100 was not successful then the Cx-Query Response would reject the registration attempt (e.g., in response to the rejected registration attempt for IMPU2).

5. The I-CSCF 308, using the name of the S-CSCF 310 determines the address of the S-CSCF 310 through a name-address resolution mechanism. The I-CSCF 308 also determines the name of a suitable home network contact point (e.g., P-CSCF 306), possibly based on information received from the P-CSCF 306 or even from the HSS 100. The I-CSCF 308 then sends a register information flow (containing P-CSCF address/name, Public User Identity, Private User Identity, P-CSCF network identifier, UE IP address) to the selected S-CSCF 310.

The S-CSCF 310 stores the P-CSCF address/name, as supplied by the visited network 314. This represents the address/name that the home network 316 uses to forward the subsequent terminating session signalling to the UE 304. The S-CSCF 310 stores the P-CSCF Network ID information.

6. The S-CSCF 310 sends a Cx-Put/Cx-Pull (Public User Identity, Private User Identity, S-CSCF name) to the HSS 100.

7. The HSS 100 stores the name of the S-CSCF 310 for that user (e.g., IMPU1) and returns the information flow Cx-Put Resp/Cx-Pull Resp (containing at least this user's user profile 110, and advantageously the policy profile 118 applicable for all of the subscribers) to the S-CSCF 310. The user profile 110 is passed from the HSS 100 to the S-CSCF 310. In addition, the Cx-Put Resp/Cx-Pull Resp would include one or more names/addresses which can be used to access the platform(s) used for service control while this particular user is registered at this S-CSCF 310. Plus, security information may also be sent for use within the S-CSCF 310. The S-CSCF 310 stores the received information for the indicated user.

In one embodiment, the Cx-Pull response message could send this particular user's user profile 110 within in two new AVPs (proprietary extensions) which are included inside the current User-Data AVP. These two new AVPs would include: (1) the user priority values 114 for the five network condition statuses 112; and (2) the IFCs 116 for the five network condition statuses 112.

Upon reception of this information via the Cx protocol, the S-CSCF 310 can check the current network status and apply the corresponding IFC 116 for the user based on the relevant network condition status 112 to determine if the user's registration attempt is going to be accepted or rejected (see FIG. 2). If an emergency happened and the network condition status 112 was subsequently changed to "4" in all the nodes of the network and assuming the corresponding minimum priority 120 is "1", as advantageously indicated for the corresponding network condition status in the policy profile 118 applicable for all of the subscribers, then the registration attempt of IMPU1 (priority "5" for network condition status "4") would be rejected. If the registration attempt was rejected, then an error message would be returned in Cx- Query response message to the corresponding UEs. Assume that this emergency did not happen during the following discussion.

8. Based on the IFCs 116, the S-CSCF 310 sends register information to the service control platform and performs whatever service control procedures would be appropriate under the circumstances (see step 6 in FIG. 4).

9. The S-CSCF 310 sends a 200 OK information flow (containing home network contact information, a GRUU set) to the I-CSCF 308.

10. The I-CSCF 308 sends an information flow 200 OK (containing home network contact information, a GRUU set) to the P-CSCF 306. The I-CSCF 308 releases all registration information after sending the information flow 200 OK.

11. The P-CSCF 306 stores the home network contact information, and sends an information flow 200 OK (containing a GRUU set) to the UE 304. If desired, the P-CSCF 306 may subscribe to a PCRF (not shown) to receive notifications about the status of the IMS signalling connectivity.

In the signal flow diagram 400, an enhanced third party registration is illustrated where the HSS 100 would if appropriate download the subscriber's user profile 110 to the GETS AS 312 in accordance with an embodiment of the present invention. Thus, upon a user registration in the IP Multimedia Subsystem (IMS) 302, the user profile 110 can be downloaded from the HSS 100 towards the S-CSCF 310, using the Cx protocol (step 4 in signal flow diagram 300) and then if desired the user profile 100 can also be downloaded from the HSS 100 towards the GETS AS 312 using the Sh protocol (step 9 in signal flow diagram 400). Complementary, as described above in respect of the download from the HSS 100 to the S-CSCF 310, the policy profile 118 applicable for all of the subscribers, if received at the S-CSCF 310, may also be downloaded from the S-CSCF 310 to the GETS AS 312. An example is provided next to describe how the third party registration could be performed during which the subscriber's user profile 110 would be downloaded from the HSS 100 to the GETS AS 312 using the Sh protocol. The steps of an exemplary third party registration are as follows:

1. User subscribes to a new emergency service (e.g., GETS, ETS). The operator provisions the emergency service (e.g., GETS, ETS) in the GETS AS 312. The GETS AS 312 uses a Sh-Update to store service data (user identity, updated data, repository data) for the user in the HSS 100.

2. The HSS 100 confirms the data is updated by sending a Sh-Update Response to the GETS AS 312.

3. Some time later, the user registers with the IP Multimedia Subsystem (IMS) 302 (see step 5 in signal flow diagram 300).

4. The S-CSCF 310 downloads the data (including user profile 110 and likely also the policy profile 118 applicable for all of the subscribers) from the HSS 100 (see steps 6-7 in signal flow diagram 300). Assume, the IFC 116 specifies that the GETS AS 312 wants to be notified when this particular user is registered (see step 8 in signal flow diagram 300).

5. The S-CSCF 310 sends 200 OK to I-CSCF 308 (see step 9 in signal flow diagram 300).

6. The S-CSCF 310 sends a third party registration message to notify the GETS AS 312 that the user is registered.

7. The GETS AS 312 sends a 200 OK to S-CSCF 310.

8. The GETS AS 312 sends a Sh-Pull to the HSS 100 requesting data needed for providing service to the user. The Sh-Pull contains a user identity, requested data, and service information. Prior to the present invention, the requested data (current enumerated data-reference AVP) could be any of the following:

RepositoryData (0)
    IMSPublicIdentity (10)
    IMSUserState (11)
    S-CSCFName (12)
    InitialFilterCriteria (13)
    LocationInformation (14)
    UserState (15)
    ChargingInformation (16)
    MSISDN (17)
    PSIActivation (18)
    DSAI (19)
    ServiceLevelTraceInfo (21)
    IPAddressSecureBindingInformation (22)

In the present invention, the GETS AS 312 requests that the HSS 100 provide the user profile 110 including the user's priority values 114 for the five network condition statuses 112, and likely also the policy profile 118 applicable for all of the subscribers with the minimum priority value 120 for each network condition status 112. To accomplish this, a new value (User's Priority) would have to be included in the aforementioned enumerated Data-Reference AVP. The modified enumerated data-reference AVP could be as follows:

RepositoryData (0)
    IMSPublicIdentity (10)
    IMSUserState (11)
    S-CSCFName (12)
    InitialFilterCriteria (13)
    LocationInformation (14)
    UserState (15)
    ChargingInformation (16)
    MSISDN (17)
    PSIActivation (18)
    DSAI (19)
    ServiceLevelTraceInfo (21)
    IPAddressSecureBindingInformation (22)
    User Priority (23)

9. The HSS 100 sends a Sh-Pull Response (containing the requested data) to the GETS AS 312. The Sh-Pull Response has a grouped User-Data AVP which includes the user profile 110 with the user priority values 114 for the different network condition statuses 112 along with the corresponding IFCs 116 and with the policy profile 118 applicable for all of the subscribers.

10. The GETS AS 312 subscribes to receive a notification from the HSS 100 whenever there are changes in the user data, by means of a Sh-Subs-Notif (containing user identity, requested data, and/or service information). For instance, the GETS AS 312 could subscribe or unsubscribe to receive notifications for updates on the user's priority level.

11. The HSS 100 uses a Sh-Subs_Notif Resp to confirm the subscription request with the GETS AS 312.

12. At some point, the user data is updated within the HSS 100. As the GETS AS 312 subscribed to receive notifications (step 10), the HSS 100 sends the requested updates to the GETS AS 312 by means of a Sh-Notif (containing user identity, updated data).

13. The GETS AS 312 acknowledges the update notification by sending a Sh-Notif Resp to the HSS 100.

14. At some point, the GETS AS 312 decides to update the user's service data (e.g. repository data) stored in the HSS 100. When this occurs, the GETS AS 312 sends a Cx-Update (containing user identity, updated data) to the HSS 100.

15. The HSS 100 confirms the service data is updated by sending a Sh-Update Resp. to the GETS AS 312.

If desired, the GETS AS 312 can be configured with different policies that indicate how to apply telecommunication services for a subscriber depending on the current network condition, the network condition statuses 112 and the user's priority values 114. For example, the GETS AS 312 upon reception of the information via the Sh protocol adapts the telecommunication service characteristics depending on the priority received for the user and the current network status (configured in the whole network). In some cases, depending on the network status, the GETS AS 312 can provide a service only to users with a certain priority while at the same time not providing the same service for normal users or users with a lower priority.

For instance, using the previous example and assuming the current network condition is "0" (normal condition, no emergency situation), the GETS AS 312 is going to receive via the Sh protocol the user information 110 for the different users IMPU 1 and IMPU2. Thereafter, the GETS AS 312 is going to analyze that IMPU 1 has priority value "1" for network status "0" so it shall apply an appropriate service that corresponds with the priority value "1". Plus, the GETS AS 312 is going to analyze that IMPU2 has priority value "5" for network status "0" so it shall apply an appropriate service that corresponds with the priority value "5". If an emergency situation happens, then the configured network status may be changed to "4" (emergency situation). In this case, the GETS AS 312 can be configured that when there is a network status "4" then a telecommunication service is going to be executed only for users with a priority value "1". In this example, the service would not be executed for IMPU1 and IMPU2. The GETS AS 312 would send IMPU1 and IMPU2's UEs an error message indicating that the telecommunication service cannot be executed. Of course, the policies that have been discussed and detailed herein for the HSS 100 and the GETS AS 312 are only some working examples where other combinations of the network condition statuses 112 and user priority values 114 can be applied as well to define a wide range of policies. Moreover, the advantageous policy profile 118 may also be taken into consideration as part of these combinations.

From the foregoing, one skilled in the art will appreciate that the present invention is aimed, at least, to minimize the aforementioned drawbacks associated with the prior art and to provide for a method of selectively providing telecommunication service access to subscribers of an IMS network by associating different user priority values with different network condition statuses. The aforementioned method can have one or more of the following features:

- Provide at least one IMS node with a calculator to determine a parameter value (0: normal condition, 1: slight congestion, 2: medium congestion, 3: high congestion, 4: emergency condition) indicating a current network status.
- Configure each IMS subscriber at a HSS with a default priority value (1: highest, 2: top, 3: medium, 4: low, 5: bottom, 6: lowest) per each network status.
- HSS able to receive information about the current network status, or calculate the current network status on its own and then reject any registration query for a subscriber with an insufficient priority for the current network status.
- If the priority is sufficient for the current network status, the HSS responds to a registration query and assigns a Serving Call Session Control Function "S-CSCF" server for serving the subscriber. The sufficiency to be advantageously determined by comparison with a minimum priority value for the applicable network condition.
- Download from the HSS towards the S-CSCF the priority value for the registered subscriber to be applied for each network status.
- Download from the HSS towards the S-CSCF the minimum priority value for each network status.
- S-CSCF able to receive information about the current network status, or calculate the current network status on its own and then deny registration for any subscriber with an insufficient priority for the current network status.
- De-registering from the S-CSCF or the GETS AS any registered subscriber with insufficient priority for the current network status.
- Configure each IMS subscriber at the HSS with an initial filter criterion "IFC" per each priority value for each network status and downloading the IFCs along with the priority values from the HSS towards the S-CSCF or the GETS AS.
- Dynamically change the priority value for the subscriber for at least one network status which can be useful when the emergency condition requires the help from unexpected civil forces. For example, services of an IMS network might be very helpful for the unexpected civil forces that carry out activities such as bomb deactivation or surgery.
- Dynamically change the priority value for those subscribers located in a particular location area for at least one network status which can be useful when the emergency condition occurs in a particularly distinguishable area.
- Dynamically change the minimum priority value for each network condition status in the policy profile, which can be useful with high emergency conditions.
- Allow the operator to dynamically dimension the network in congestion or emergency cases.

Although one embodiment of the present invention has been illustrated in the accompanying Drawings and described in the foregoing Detailed Description, it should be understood that the invention is not limited to the disclosed embodiment, but instead is also capable of numerous rearrangements, modifications and substitutions without departing from the present invention that as has been set forth and defined within the following claims.

The invention claimed is:

1. A method implemented by a serving call session control function for supporting an emergency telecommunications service, said method comprising the steps of:
   receiving a user profile for a registered subscriber, where the user profile includes a plurality of network condition statuses, where a user priority value is associated with each network condition status, and where the one or more user priority values are associated with the emergency telecommunications service;
   determining a current network condition; and
   deregistering the registered subscriber as a result of using the user profile to determine that the registered subscriber has an insufficient user priority value based on the current network condition.

2. The method of claim 1, further comprising the steps of:
   receiving an emergency policy profile applicable for all subscribers, where the emergency policy profile includes the plurality of network condition statuses, and where a minimum priority value is associated with each network condition status; fetching from the emergency policy profile the minimum priority value associated with the network condition status that corresponds with the current network condition;
   fetching from the user table the user priority value associated with the network condition status that corresponds with the current network condition;
   comparing the fetched minimum priority value to the fetched user priority value and if the fetched user priority value corresponds to a lower user priority than the fetched minimum priority value then determining there is an insufficient user priority value based on the current network condition.

3. A serving call session control function node for supporting an emergency telecommunications service, said serving call session control function node comprising:
a processor; and
a memory that stores processor-executable instructions where the processor interfaces with the memory and executes the processor-executable instructions to:
receive a user profile for a registered subscriber, where the user profile includes a plurality of network condition statuses, where a user priority value is associated with each network condition status, and where the one or more user priority values are associated with the emergency telecommunications service;
receive an emergency policy profile, where the emergency policy profile includes the plurality of network condition statuses, and where a minimum priority value is associated with each network condition status;
determine a current network condition;
fetch from the emergency policy profile the minimum priority value associated with the network condition status that corresponds with the current network condition;
fetch from the user profile the user priority value associated with the network condition status that corresponds with the current network condition;
compare the fetched minimum priority to the fetched user priority value and if the fetched user priority value corresponds to a lower user priority than the fetched minimum priority value, then determining there is an insufficient user priority value based on the current network condition, otherwise determining there is a sufficient user priority; and
deregister the registered subscriber when the registered subscriber has the insufficient user priority value based on the current network condition.

4. A call session control node for supporting an emergency telecommunications service, the serving call session control node comprising:
a processor; and
a memory that stores processor-executable instructions where the processor interfaces with the memory and executes the processor-executable instructions to:
receive a user profile for a registered subscriber, where the user profile includes a plurality of network condition statuses, where a user priority value is associated with each network condition status, and where the one or more user priority values are associated with the emergency telecommunications service;
determine a current network condition; and
deregister the registered subscriber as a result of using the user profile to determine that the registered subscriber has an insufficient user priority value based on the current network condition.

5. A method implemented by a home subscriber server for supporting an emergency telecommunications service in a telecommunication network, the method comprising the step of:
provisioning a user table to store a plurality of network condition statuses, where each network condition status is associated with a user priority value for the emergency telecommunications service;
provisioning an emergency policy table to store the plurality of network condition statuses, where each network condition status is associated with a minimum priority value for subscribers;
upon receiving a registration request for a subscriber, determining a current network condition;
fetching from the emergency policy table the minimum priority value associated with the network condition status that corresponds with the current network condition;
fetching from the user table the user priority value associated with the network condition status that corresponds with the current network condition; and
when the fetched user priority value is equal or higher than the fetched minimum priority value, allowing the registration request for the subscriber, and otherwise, rejecting the registration request for the subscriber.

6. The method of claim 5, wherein the plurality of network condition statuses and associated user priority values stored in the user table are included in a user profile for the subscriber.

7. The method of claim 6, further comprising the step of responding to a pull query from a serving call session control function by downloading at least the user profile for the subscriber to the serving call session control function.

8. The method of claim 6, further comprising the step of responding to a pull query from an application server by downloading at least the user profile for the subscriber to the application server.

9. The method of claim 6, wherein the user profile further includes a plurality of initial filter criteria, where at least one of the initial filter criteria is associated with one network condition status and its associated user priority value.

10. The method of claim 5, wherein the step of determining the current network condition further comprises a step of receiving information about the current network status.

11. The method of claim 10, wherein the step of receiving information about the current network condition includes a step of provisioning the received current network condition by overwriting a previously received current network condition.

12. A home subscriber server for supporting an emergency telecommunications service, the home subscriber server comprising:
a user table adapted to store a plurality of network condition statuses, where each network condition status is associated with a user priority value for the emergency telecommunications service;
an emergency policy table adapted to store the plurality of network condition statuses, where each network condition status is associated with a minimum priority value for subscribers;
a processor; and
a memory that stores processor-executable instructions where the processor interfaces with the memory and executes the processor-executable instructions to:
provision the user table and the emergency policy table;
receive a registration request for a subscriber;
determine a current network condition;
fetch from the emergency policy table the minimum priority value associated with the network condition status that corresponds with the current network condition;
fetch from the user table the user priority value associated with the network condition status that corresponds with the current network condition; and where the fetched user priority value is equal or higher than the fetched minimum priority value, allow the registration request for the subscriber;

otherwise reject the registration request for the subscriber.

13. The home subscriber server of claim 12, wherein the plurality of network condition statuses and associated user priority values stored in the user table are included in a user profile for the subscriber.

14. The home subscriber server of claim 13, wherein the user profile further includes a plurality of initial filter criteria, where at least one of the initial filter criteria is associated with one network condition status and its associated user priority value.

15. The home subscriber server of claim 12, wherein the plurality of network condition statuses includes at least two of:
   a normal network condition;
   a slight network congestion;
   a medium network congestion;
   a high network congestion; and
   an emergency condition.

16. The home subscriber server of claim 12, wherein the plurality of priority values includes at least two of:
   a highest priority value;
   a top priority value;
   a medium priority value;
   a low priority value;
   a bottom priority value; and
   a lowest priority value.

* * * * *

UNITED STATES PATENT AND TRADEMARK OFFICE
CERTIFICATE OF CORRECTION

PATENT NO.        : 8,634,798 B2                                    Page 1 of 1
APPLICATION NO.   : 13/383746
DATED             : January 21, 2014
INVENTOR(S)       : Blanco et al.

It is certified that error appears in the above-identified patent and that said Letters Patent is hereby corrected as shown below:

On the Title Page, Item (56), under "OTHER PUBLICATIONS", in Column 2, Line 3, delete "Qos" and insert -- QoS --, therefor.

In the Specification

In Column 5, in Table #2, Line 7, delete "attack…)" and insert -- attack…)) --, therefor.

In Column 5, Line 40, delete "HSS 110" and insert -- HSS 100 --, therefor.

In Column 8, Line 5, delete "I-CSCF 304" and insert -- I-CSCF 308 --, therefor.

In Column 8, Line 10, delete "I-CSCF 304" and insert -- I-CSCF 308 --, therefor.

In Column 9, Line 29, delete "user profile 100" and insert -- user profile 110 --, therefor.

Signed and Sealed this
Eighth Day of July, 2014

Michelle K. Lee
*Deputy Director of the United States Patent and Trademark Office*